United States Patent
Dupre

[15] 3,695,439
[45] Oct. 3, 1972

[54] WASTE TREATMENT SYSTEMS

[72] Inventor: Herman K. Dupre, Seven Springs, Champion, Pa. 15622

[22] Filed: Oct. 12, 1970

[21] Appl. No.: 79,746

[52] U.S. Cl. .................210/173, 210/197, 210/207
[51] Int. Cl. ..............................................C02c 5/06
[58] Field of Search........210/63, 173, 197, 207, 209, 210/152

[56] References Cited

UNITED STATES PATENTS

| | | |
|---|---|---|
| R26,931 | 7/1970 | Valdespino............210/173 X |
| 3,396,102 | 8/1968 | Forrest..................210/197 X |
| 3,630,372 | 12/1971 | Weir et al...............210/197 |

FOREIGN PATENTS OR APPLICATIONS

| | | |
|---|---|---|
| 496,971 | 11/1950 | Belgium..........................207/ |
| 407,001 | 2/1934 | Great Britain.............210/207 |

Primary Examiner—Reuben Friedman
Assistant Examiner—Frederick F. Calvetti
Attorney—Buell, Blenko & Ziesenheim

[57] ABSTRACT

A sewage disposal apparatus is provided having an outer cylindrical tank on a vertical axis, a conical end closing the bottom of the cylindrical tank, an inner cylinder concentric with and within the outer tank, a source of oxygen containing gas under pressure, a gas diffuser means adjacent the bottom of the inner cylinder connected to said source of oxygen containing gas and discharging said gas within the inner cylinder, a sewage inlet line discharging into the inner cylinder with comminuting means in the inlet line, and a pump means extending from the point adjacent the apex of the cone to the inlet line delivering fluid and solids from the cone apex to the inlet line and discharge means from the area between the outer cylindrical tank and the inner cylinder.

6 Claims, 3 Drawing Figures

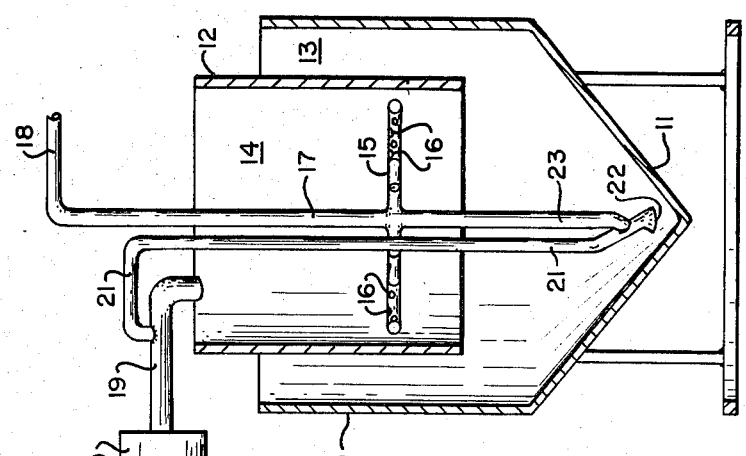
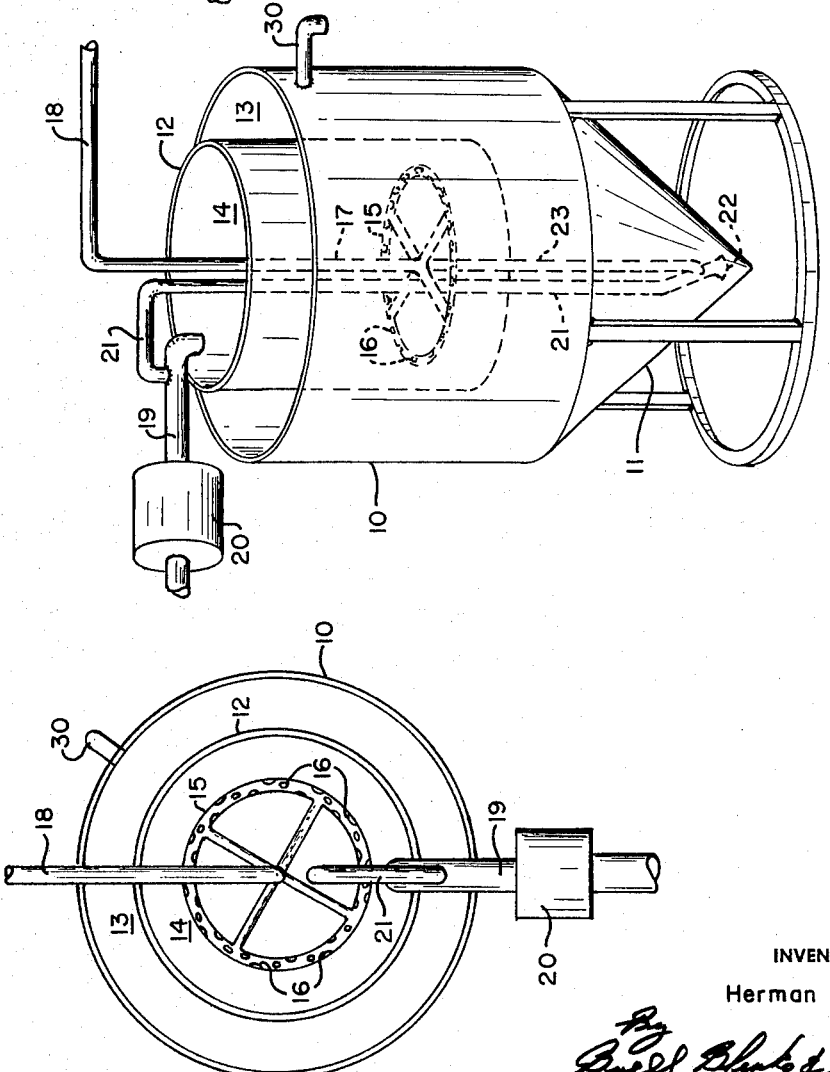
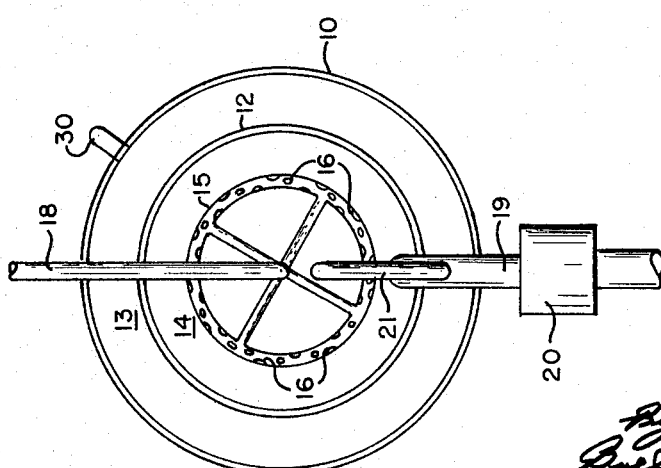
INVENTOR
Herman K. Dupre

3,695,439

WASTE TREATMENT SYSTEMS

This invention relates to waste treatment systems and particularly to a sewage disposal or treatment system for use with private homes, small factories, motels, hotels and the like.

The problem of waste disposal is universally recognized as one of the most serious problems facing this nation. Untreated sewage is one of the major water pollutants and one of the most serious. This is particularly true in the case of motels, hotels, small factories and the like in suburban and rural areas where no large urban sewage system is available. Many small dewage disposal systems have been proposed in the past. Such systems are not very efficient and are generally complex and expensive. For example Meyer et al. U.S. Pat. No. 3,401,115 describes a sewage treatment system which is designed to mix caustic alkali solution with the sewage to break down the sewage. Schryver U.S. Pat. No. 3,458,140 describes a sewage treatment method using a biodegrading furnace to sterilize the sewage. Other patents such as Mallory U.S. Pat. No. 2,138,349 show aerating apparatus for treating sewage. In addition various septic systems and lagoon systems have been used for this purpose. None of these systems has had the efficiency desired and cleaning has been a constant problem.

The present invention provides a highly efficient sewage disposal system which treats sewage faster in a smaller container and at lower cost than prior art systems.

Preferably I provide a cylindrical tank on a vertical axis, a conical bottom end general description of my invention the bottom end of said cylinder, an inner cylinder concentric with the tank, a source of air under pressure, an air diffuser means adjacent the bottom of the inner cylinder connected to the source of air under pressure, a sewage inlet line discharging into the inner cylinder, comminuting means in the inlet line, and pump means extending from a point adjacent the apex of the cone to the inlet line, delivering fluid from the cone apex to the inlet line. Preferably the pump means is an air line delivering air under pressure to the bottom of a vertical delivery line extending from adjacent the apex of the cone to the inlet line where the fluid sewage is moved from the apex of the cone to the inlet line and mixed with incoming sewage. The air diffuser means is preferably an annular ring with a plurality of spaced openings for discharging air at the bottom of the inner cylinder.

In the foregoing general description of my invention I have set out certain objects, purposes, and advantages of my invention. Other objects, purposes and advantages of this invention will be apparent from a consideration of the following description and the accompanying drawings in which:

FIG. 1 is an isometric view of a sewage disposal unit according to my invention;

FIG. 2 is a top plan view of the sewage disposal unit of FIG. 1; and

FIG. 3 is a vertical section of the sewage disposal unit of FIG. 1.

Referring to the drawings I have illustrated a sewage disposal unit having an outer cylindrical housing 10 provided with an inverted conical bottom 11. An inner concentric cylinder 12 which is open at both ends is provided within the housing 10 spaced from the housing to provide an annular outer well 13 and an inner cylindrical well 14. An annular ring 15 provided with spaced openings 16 is held adjacent the bottom of cylinder 12 in the inner cylindrical well 14 by a vertical axial air line 17 extending into inner well 14 and connected to a source of air under pressure such as an air compressor (not shown) by line 18. An inlet line 19 provided with a grinder 20 delivers raw sewage to the inner well 14. A vertical line 21 extends from a point adjacent the apex of the conical bottom 11 to the inlet line 19. The line 21 is provided with an air inlet 22 connected to a source of air under pressure such as an air compressor (not shown) by an air line 23 which delivers air to the bottom of line 21 which acts as a pumping means to deliver settled solids from the apex of the cone into the raw sewage being delivered through inlet line 19.

The operation of the sewage disposal unit is as follows. Raw sewage is delivered from line 19 through grinder 20 where it is comminuted to small size particles to provide the maximum surface area and then discharged into well 14. Air is bubbled upwardly through the sewage in well 14 through opening 16 in ring 15. This provides $O_2$ in the liquid system which reacts with the sewage to oxidize the same. The oxidized sewage generally forms two different forms of materials, one which is light and tends to float and one portion which settles to form settable solids in the come 11. If these settable solids are left they tend to ferment and create odors. It is accordingly desirable to get them up and back into the area where they can be further oxidized. This I accomplish by introducing air through pipe 23 and inlet 22 into the bottom of pipe 21. This causes the solids to be lifted in pipe 21 and delivered back into inlet pipe 19. Since the settable solids have large amounts of bacteria which promote oxidation of the sewage, their introduction into the raw sewage accelerates its oxidation and improves the efficiency of the unit. I find that I am able to complete oxidation of the raw sewage coming into my sewage disposal unit in about half the time accepted for conventional units. As a result I am able to treat an equal amount of sewage in a much smaller vessel than is conventionally possible.

The effluent from my unit is discharged through outlet 30 which is preferably about one inch below the top surface of the fluids in the outer annular well 13.

In the foregoing specification I have set out a preferred embodiment of my invention, however it will be understood that my invention may be otherwise embodied within the scope of the following claims.

I claim:

1. A sewage disposal device comprising an outer cylindrical tank on a vertical axis, a conical end closing the bottom of said cylinder, an inner cylinder open at both ends concentric with and inside the tank, a source of oxygen containing gas under pressure, a gas diffuser means adjacent the bottom open end of the inner cylinder connected to said source of oxygen containing gas and discharging said oxygen containing gas within said inner cylinder, a sewage inlet line discharging into the inner cylinder, comminuting means in the inlet line, and pump means extending from a point adjacent the apex of the cone to the inlet line continuously delivering fluid and solids from the cone apex to the inlet line for mixture with sewage prior to discharge into the inner cylinder and discharge means from the area between the outer cylindrical tank and the inner cylinder.

2. A sewage disposal apparatus as claimed in claim 1 wherein the source of oxygen containing gas is a means for supplying air under pressure.

3. A sewage disposal apparatus as claimed in claim 1 wherein the gas diffuser means is a perforate annular ring.

4. A sewage disposal apparatus as claimed in claim 1 wherein the pump means is an air lift means.

5. A sewage disposal apparatus as claimed in claim 3 wherein the annular ring is adjacent and within the bottom of the inner cylinder.

6. A sewage disposal apparatus as claimed in claim 1 wherein the discharge means communicates with the said area between the outer cylindrical tank and the inner cylinder and below the normal surface level of fluid therein.

* * * * *

UNITED STATES PATENT OFFICE
CERTIFICATE OF CORRECTION

Patent No. 3,695,439     Dated October 3, 1972

Inventor(s) Herman K. Dupre

It is certified that error appears in the above-identified patent and that said Letters Patent are hereby corrected as shown below:

Column 1, lines 32 and 33, cancel "general description of my invention"; line 32, after "end" insert -- closing -- . Column 2, line 30, "come" should read -- cone -- .

Signed and sealed this 1st day of May 1973.

(SEAL)
Attest:

EDWARD M. FLETCHER, JR.
Attesting Officer

ROBERT GOTTSCHALK
Commissioner of Patents